US010068238B2

(12) United States Patent
Rupp (10) Patent No.: US 10,068,238 B2
(45) Date of Patent: Sep. 4, 2018

(54) INCENTIVE-BASED SYSTEM AND METHOD FOR THIRD-PARTY WEB APPLICATION DEVELOPMENT AND PUBLICATION

(75) Inventor: Jason Rupp, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 2941 days.

(21) Appl. No.: 11/752,912

(22) Filed: May 23, 2007

(65) Prior Publication Data
US 2008/0294515 A1    Nov. 27, 2008

(51) Int. Cl.
G06Q 30/00    (2012.01)
G06Q 30/02    (2012.01)

(52) U.S. Cl.
CPC ......... *G06Q 30/02* (2013.01); *G06Q 30/0224* (2013.01); *G06Q 30/0239* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 5,884,312 | A * | 3/1999 | Dustan et al. | |
| 5,948,061 | A * | 9/1999 | Merriman | G06Q 30/02 705/14.53 |
| 6,297,819 | B1 * | 10/2001 | Furst | 715/733 |
| 7,139,758 | B1 * | 11/2006 | Laws et al. | |
| 7,149,704 | B2 * | 12/2006 | Martin et al. | 705/10 |
| 7,433,835 | B2 * | 10/2008 | Frederick et al. | 705/26.1 |
| 7,873,710 | B2 * | 1/2011 | Kiley et al. | 709/220 |
| 2001/0034646 | A1 * | 10/2001 | Hoyt et al. | 705/14 |
| 2002/0065802 | A1 * | 5/2002 | Uchiyama | 707/1 |
| 2002/0087661 | A1 * | 7/2002 | Matichuk et al. | 709/218 |
| 2002/0112048 | A1 * | 8/2002 | Gruyer et al. | 709/224 |
| 2004/0044566 | A1 * | 3/2004 | Bostelmann et al. | 705/14 |
| 2005/0038702 | A1 * | 2/2005 | Merriman et al. | 705/14 |
| 2005/0171838 | A1 * | 8/2005 | Eglinton | 705/14 |
| 2005/0172323 | A1 * | 8/2005 | Yang et al. | 725/109 |
| 2005/0198348 | A1 * | 9/2005 | Yeates | H04L 12/6418 709/232 |
| 2006/0089880 | A1 * | 4/2006 | Merriman et al. | 705/14 |

(Continued)

OTHER PUBLICATIONS

Definition of web bug : http://en.wikipedia.org/wiki/Web_bug.*

*Primary Examiner* — Matthew T Sittner
*Assistant Examiner* — Allan J Woodworth, II
(74) *Attorney, Agent, or Firm* — James J. DeCarlo; Greenberg Traurig, LLP (57) ABSTRACT

A system and method is described by which a business entity provides an incentive to a third party to develop and publish a Web application that facilitates access to a Web service hosted by the business entity. In accordance with the system and method, a user attempts to use the third-party Web application via a Web browser executing on a client device, but fails because the user is unauthorized to use the service. Responsive to attempting to use the third-party Web application, tracking information is downloaded to the client device via the Web browser. The user then accesses a Web application hosted by the business entity to subscribe to the Web service. The Web application hosted by the business entity detects the tracking information stored on the client device and initiates a process for issuing payment to the third party responsive to detecting the tracking information.

18 Claims, 8 Drawing Sheets

(56) References Cited

U.S. PATENT DOCUMENTS

| | | | |
|---|---|---|---|
| 2007/0011199 A1* | 1/2007 | Hunt et al. | 707/104.1 |
| 2007/0299964 A1* | 12/2007 | Wong | G06Q 30/02 709/224 |
| 2008/0027809 A1* | 1/2008 | Storm | 705/14 |
| 2008/0177600 A1* | 7/2008 | McCarthy et al. | 705/7 |
| 2008/0189360 A1* | 8/2008 | Kiley | G06F 17/30867 709/203 |
| 2008/0249905 A1* | 10/2008 | Wong et al. | 705/34 |

* cited by examiner

INCENTIVE-BASED SYSTEM AND METHOD FOR THIRD-PARTY WEB APPLICATION DEVELOPMENT AND PUBLICATION

BACKGROUND OF THE INVENTION

Field of the Invention

The invention generally relates to Web applications. In particular, the invention is related to a system and method by which a business entity provides an incentive to a third party to develop and publish a Web application that facilitates access to a Web service hosted by the business entity.

Background

A Web service is a software system designed to support interoperable machine-to-machine interaction over a network, such as the Internet. A Web service typically includes a back-end system for performing basic functions necessary to provide the service as well as Web APIs (application programming interfaces) for submitting service requests to the back-end and optionally receiving content in return. A Web application is typically used to present a front-end for the Web service to a user's Web browser. The services accessed by a remote user in this manner may include, for example, an e-mail service, a news service, an on-line shopping service, an on-line dating service, a news service, a job-search service, an employee-search service, or the like.

Often, a business entity that hosts a Web service also develops and hosts the only Web application(s) that can be used to access to the service. This enables the business entity to maintain tight control over how the Web service is accessed. Such tight control may be desired for any number of reasons, including but not limited to reducing system complexity, achieving security goals, or ensuring that the service is offered to the public in a uniform manner.

However, there are instances where a business entity may want to encourage third parties to develop and publish Web applications that provide a separate and different means for accessing the business entity's Web service. For example, due to resource constraints, the business entity may be incapable of developing Web applications that include all of the tools and features required to meet the needs of niche users. In this instance, the participation of third-party developers may be desirable or even necessary. In particular, by developing and publishing applications that include tools and features that are relevant to niche users, third-party developers can enable the business entity to provide the Web service to otherwise-inaccessible niche markets.

Furthermore, by encouraging third parties to build and publish Web applications that facilitate access to its Web service, a business entity can increase the number and diversity of Web applications available for leveraging its service. Innovation by such third parties may result in the generation of a more useful and interesting feature set for users of the Web service. This has the net effect of increasing the value of the service to the users which, in turn, provides a competitive advantage to the business entity.

Additionally, by building and publishing Web applications that use a particular Web service, third parties may increase the overall visibility and accessibility of that Web service. This may result in an increase in the number of consumers of the Web service as well as an increase in the amount of traffic to the Web site of the business entity that hosts the Web service.

Thus, as noted above, there are several reasons why a business entity hosting a Web service may want to encourage third parties to develop and publish Web applications that facilitate access to the Web service. At a minimum, the business entity must provide such third parties with access to the Web APIs necessary for building such applications. Equipped with these Web APIs, a third party might develop and publish such a Web application simply because they exact some personal satisfaction from doing so or as a matter of public service. However, absent some financial incentive, it is unlikely that a large number of third parties will invest the time, money and energy necessary to develop and publish such applications.

If the Web service already has a large number of users, one potential financial incentive for the third party is to attract the same large number of users, or some portion thereof, to their own Web site. However, increased traffic to a third-party Web site does not always result in increased revenue for the third party. Moreover, such an incentive does not even arise where the Web service does not have a large number of users.

What is needed, then, is a system and method by which a business entity can provide an incentive to a third party to develop and publish a Web application that facilitates access to a Web service hosted by the business entity. The desired system should provide a more direct financial incentive to the third party for developing and publishing such a Web application than merely attracting a pre-existing set of users of the Web service to a Web site published by the third party.

BRIEF SUMMARY OF THE INVENTION

The present invention provides a system and method by which a business entity can provide an incentive to a third party to develop and publish a Web application that facilitates access to a Web service hosted by the business entity. The system and method of the present invention provides a more direct financial incentive to the third party for developing and publishing such a Web application than merely attracting a pre-existing set of users of the Web service to a Web site published by the third party.

In particular, an embodiment of the present invention is a method for providing an incentive to a third party for developing and publishing a third-party Web application that facilitates access to a Web service hosted by a business entity. The method includes publishing the third-party Web application on a third-party Web site and including tracking logic within the third-party Web site. The tracking logic is configured to download tracking information, such as one or more HTML cookies, for storage by a client device responsive to an indication that a user is attempting to access the third-party Web application via a Web browser executing on the client device. The tracking information is adapted for detection by a Web application hosted by the business entity for subscribing to the Web service. The Web application hosted by the business entity is configured to initiate a process for issuing payment to the third party responsive to detecting the tracking information.

In accordance with the foregoing method, the tracking logic may be configured to download the tracking information responsive to the user accessing a particular Web page, or responsive to an indication that the user that is attempting to access the third-party Web application is not authorized to use the Web service. The foregoing method may further include providing a link within the third-party Web site that facilitates access to the Web application hosted by the business entity for subscribing to the Web service. In accordance with this further embodiment, the tracking logic may be configured to download the tracking information responsive to the user activating the link.

Another embodiment of the present invention is a system that includes a processing unit and a memory. The memory stores third-party Web site logic for enabling the processing unit to present Web pages and associated content to a user via a Web browser executing on a client device. The third-party Web site logic includes third-party Web application logic and tracking logic. The third-party Web application logic enables the processing unit to present a third-party Web application to the user via the Web browser that facilitates access to a Web service hosted by a business entity. The tracking logic enables the processing unit to download tracking information, such as one or more HTML cookies, for storage by the client device responsive to an indication that the user is attempting to access the third-party Web application via the Web browser. The tracking information is adapted for detection by a Web application hosted by the business entity for subscribing to the Web service. The Web application hosted by the business entity is configured to initiate a process for issuing payment to the third party responsive to detecting the tracking information.

In accordance with the foregoing system, the tracking logic may include logic for enabling the processing unit to download the tracking information responsive to the user accessing a particular Web page or responsive to an indication that the user that is attempting to access the third-party Web application is not authorized to use the Web service. The third-party Web site logic of the foregoing system may further include a link that enables the processing unit to facilitate access to the Web application hosted by the business entity for subscribing to the Web service. In accordance with this further embodiment, the tracking logic may include logic for enabling the processing unit to download the tracking information responsive to an indication that the user has activated the link.

Yet another embodiment of the present invention is a method for providing an incentive to a third party for developing and publishing a third-party Web application that facilitates access to a Web service hosted by a business entity. The method includes hosting a Web application by the business entity and including detection logic, such as a Web beacon, within the Web application hosted by the business entity. The Web application hosted by the business entity is configured to permit a user to subscribe to the Web service via a Web browser executing on a client device. The detection logic is configured to detect tracking information, such as one or more HTML cookies, stored on the client device. The detection logic is further configured to initiate a process for issuing payment to the third party responsive to detecting the tracking information. The tracking information has been downloaded to the client device responsive to a user of the Web browser attempting to use a third-party Web application via the Web browser.

In one embodiment of the foregoing method in which the detection logic is a Web beacon, the Web beacon may be configured to provide the tracking information to a tracking service operated on behalf of the business entity. The detection logic may also be configured to initiate the process for issuing payment to the third party further responsive to an indication that the user has subscribed to the Web service.

Still another embodiment of the present invention is a system that includes a processing unit and a memory. The memory stores Web application logic for enabling the processing unit to present Web pages and associated content to a user via a Web browser executing on a client device. The Web application logic includes subscription logic and detection logic, such as a Web beacon. The subscription logic enables the processing unit to permit the user to subscribe to a Web service hosted by a business entity via the Web browser. The detection logic enables the processing unit to detect tracking information, such as one or more HTML cookies, stored on the client device and to initiate a process for issuing payment to a third party responsive to detecting the tracking information. The tracking information has been downloaded to the client device responsive to a user of the Web browser attempting to use a third-party Web application via the Web browser.

In one embodiment of the foregoing system in which the detection logic is a Web beacon, the Web beacon may include logic for enabling the processing unit to provide the tracking information to a tracking service operated on behalf of the business entity. The detection logic may also enable the processing unit to initiate the process for issuing payment to the third party further responsive to an indication that the user has subscribed to the Web service.

A further embodiment of the present invention is a method for providing an incentive to a third party for developing and publishing a third-party Web application that facilitates access to a Web service hosted by a business entity. In accordance with the method, a user attempts to use the third-party Web application via a Web browser executing on a client device. Responsive to attempting to use the third-party Web application, tracking information, such as one or more HTML cookies, is received via the Web browser and stored in the client device. The user then accesses a Web application hosted by the business entity via the Web browser to subscribe to the Web service. The Web application hosted by the business entity is configured to detect the tracking information stored on the client device and to initiate a process for issuing payment to the third party responsive to detecting the tracking information.

In accordance with the foregoing method, receiving the tracking information responsive to attempting to use the third-party Web application may include receiving the tracking information responsive to accessing a particular Web page, receiving the tracking information responsive to an unsuccessful attempt by the user to use the third-party Web application to access the Web service, or receiving the tracking information responsive to activating a link within a Web site.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Overview

Figure 1:
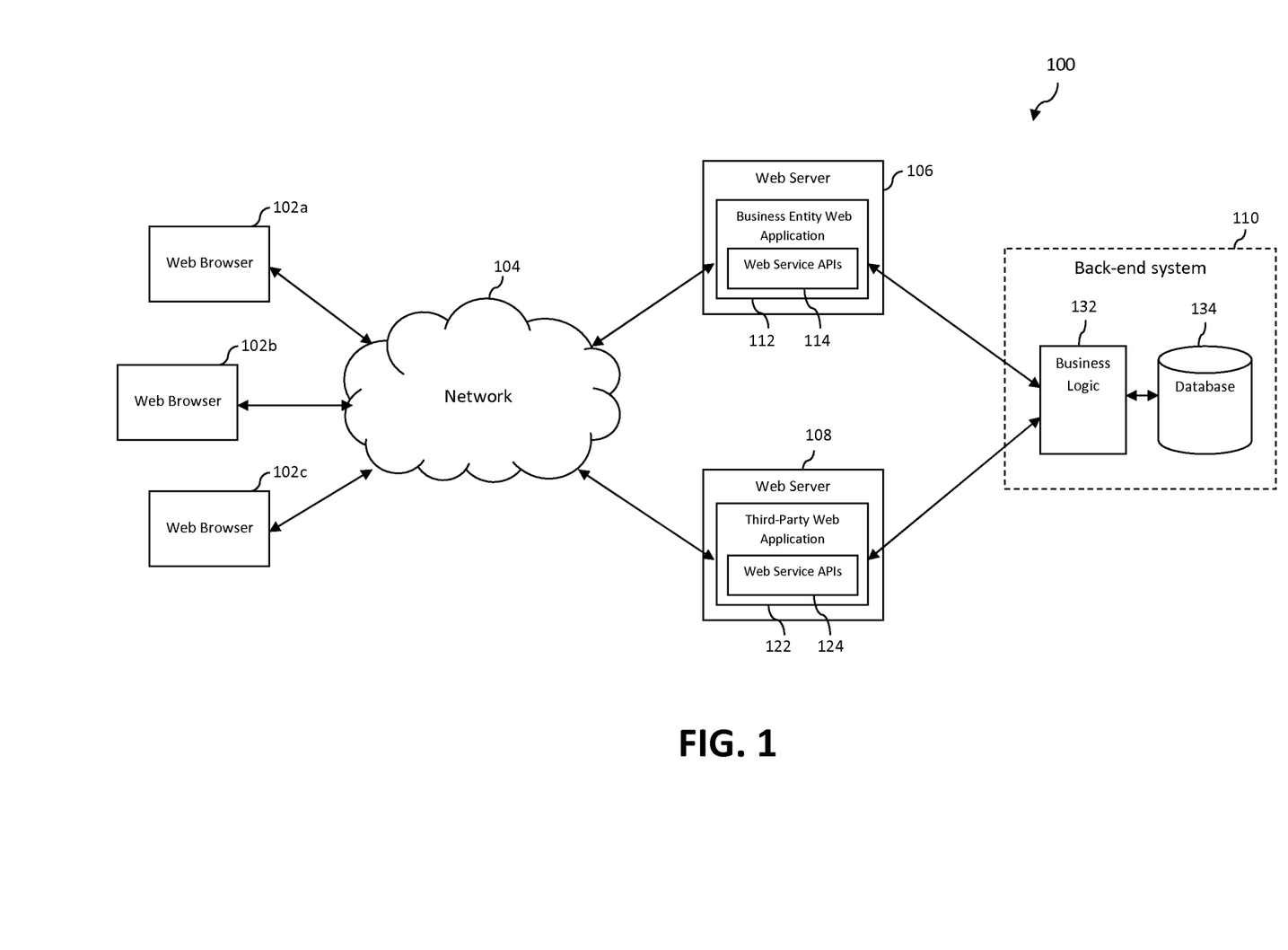
FIG. 1 is a block diagram of an example system for providing a Web service to a user.

FIG. 1 is a block diagram of a system 100 for providing a Web service to a user. System 100 is described herein to provide a context for further description of various embodiments of the present invention. However, the description of system 100 is not intended to limit the present invention.

As shown in FIG. 1, system 100 includes a back-end system 110. Back-end system 110 is owned and operated by a business entity and is configured to perform functions necessary to provide a Web service to remote users over a network 104. Network 104 may be any type of network that is capable of transporting data between remote entities, including but not limited to the Internet, an intranet, or an extranet. The Web service provided to remote users over network 104 may be an e-mail service, a news service, an on-line shopping service, an on-line dating service, a news service, a job-search service, an employee-search service, or any other service that can be provided to remote users via a network such as network 104.

As further shown in FIG. 1, back-end system 110 includes business logic 132 and a database 134. Database 134 is configured to store information that is needed to provide the Web service to remote users. For example, in an implementation in which the Web service is an e-mail service, database 134 may store e-mail messages received or sent by a user, information associated with such messages (e.g., sender, recipient(s), subject, date/time sent, message flags), attachments to such messages, system and/or personal folders into which such messages are organized, user address book information, user e-mail account information, or the like.

Business logic 132 is configured to receive requests from remote users of the Web service and in response to receiving such requests, to perform certain actions such as adding, deleting or modifying data in database 134, returning a copy of data stored in database 134, or sending or transferring data for receipt by entities external to back-end system 110. For example, in an implementation in which the Web service is an e-mail service, business logic 132 may be configured to perform a variety of actions, such as: adding a new personal folder to a user's list of e-mail folders, deleting a selected e-mail message, downloading a file attached to an e-mail to a requesting device, deleting all e-mail messages in a specified folder, retrieving e-mail messages from an external account not managed by the business entity, setting a flag associated with one or more e-mail messages, fetching the content of specified e-mail messages and placing such content in a folder, returning a header for a specified e-mail message, obtaining account information about a user, returning a list of a user's e-mail folders, returning a list of e-mail messages for a specified user, moving an e-mail message or group of e-mail messages from a first folder to a second folder, deleting a specified personal folder, renaming a specified personal folder, clearing a user's spam filter profile, saving a user's e-mail message, searching for e-mail messages based on certain criteria and provide results of the search to the user, sending a new e-mail message to another user, making a change to a user's e-mail profile, or uploading an attachment to an e-mail from a requesting device. Persons skilled in the relevant art(s) will appreciate that these methods are described by way of example only, and business logic 132 may be configured to perform additional operations or different operations entirely.

Business logic 132 is configured to receive and service requests that are formatted in accordance with a predefined set of Web service APIs. The Web service APIs provide a common interface by which entities external to back-end system 110 can access the various service-related operations that can be performed by business logic 132. As will be appreciated by persons skilled in the relevant art(s), the Web service APIs may be defined in accordance with any of a number of well-known Web service protocols including but not limited to SOAP, REST (Representational State Transfer), JSON (JavaScript Object Notation) or XML. Alternatively, the Web service APIs may be defined in accordance with a proprietary Web service protocol.

In order to offer the services provided by back-end system 110 to remote users over network 104, the business entity that owns and operates the back-end system may also host a Web application 112. Web application 112 is executed on a Web server 106, which is typically also owned and operated by the business entity. Generally speaking, Web application 112 is a computer program that is configured to receive HTTP (Hypertext Transfer Protocol) requests from one or more Web browsers, such as any of Web browsers 102a, 102b or 102c, and to serve HTTP responses to the browsers in response to receiving the requests. Such HTTP responses may be served with optional data content, which usually comprises Web pages such as HTML documents and linked objects.

In particular, Web application 112 is configured to serve Web pages to a Web browser that allow a user of the Web browser to issue service requests to back-end system 110 and to receive content responsive to those requests from back-end system 110. A user of a Web browser interacts in a well-known manner with objects within a Web page served by Web application 112 to cause Web application 112 to generate service requests for back-end system 110. Web application 112 is also configured to provide content received from back-end system 110 to the user via the user's Web browser. In this manner, Web application 112 acts as a proxy between a Web browser and back-end system 110.

Web application 112 includes implementations of Web service APIs 114 that are used by Web application 112 to generate service requests for back-end system 110 and to interpret responses to those requests received from back-end system 110. As noted above, the Web service APIs may be defined in accordance with any of a variety of well-known Web-service protocols or in accordance with a proprietary Web-service protocol.

In an implementation of network system 100 in which the Web service supported by back-end system 110 is an e-mail service, Web application 112 may be an e-mail application that is configured to serve Web pages to a Web browser that allow a user of the browser to perform a variety of functions pertaining to the user's e-mail account.

Conceptually, the combination of Web application 112 and a Web browser (such as any of Web browsers 102a, 102b or 102c) can be thought of as providing a "front-end" for the Web service supported by back-end system 110. Persons skilled in the relevant art(s) will readily appreciate that a system for providing a Web service to a user may include multiple instances of back-end system 110 as well as multiple instances of Web application 112, wherein each instance of back-end system 110 and/or each instance of Web application 112 is implemented using one or more physical devices.

As noted in the background section above, some business entities that own and operate a back-end system such as back-end system 110 will also host the only Web applications that are capable of facilitating access to the Web service supported by the back-end system. However, for a variety of reasons also discussed in that section, the business entity may also seek to encourage third parties to develop and publish their own Web applications that facilitate access to the Web service.

Thus, for example, the business entity may want to encourage a third party to develop a Web application, such as third party Web application 122, that is configured to present a different front-end for back-end system 110. The Web application 122 so developed by a third party may provide different or additional features to a user of the Web service than those provided by Web application 112, provided that those features are supported by back-end system 110 and provided that Web application 122 requests such services using the appropriate Web APIs. Furthermore, Web application 122 may provide the same features as Web application 112 but in a different manner or using a different interface than Web application 112. By hosting Web application 122 on a Web server 108 (or by paying another party to host Web application 122 on Web server 108), the third party provides users with another means for using the Web service supported by back-end 110.

A third party may choose to develop and publish such a Web application purely for the personal enjoyment of doing so or to provide a public service. However, to increase the number of third parties willing to develop and host new Web applications, the business entity may want to provide a financial incentive to third parties. One financial incentive for developing and publishing such a Web application by a third party may include attracting users of the Web service to a third-party Web site. However, the financial incentive here is indirect, since increased traffic to a third-party Web site may not result in any additional revenue for the third party. Accordingly, the present invention provides a more direct financial incentive to the third party for developing and hosting such a Web application.

Figure 2:
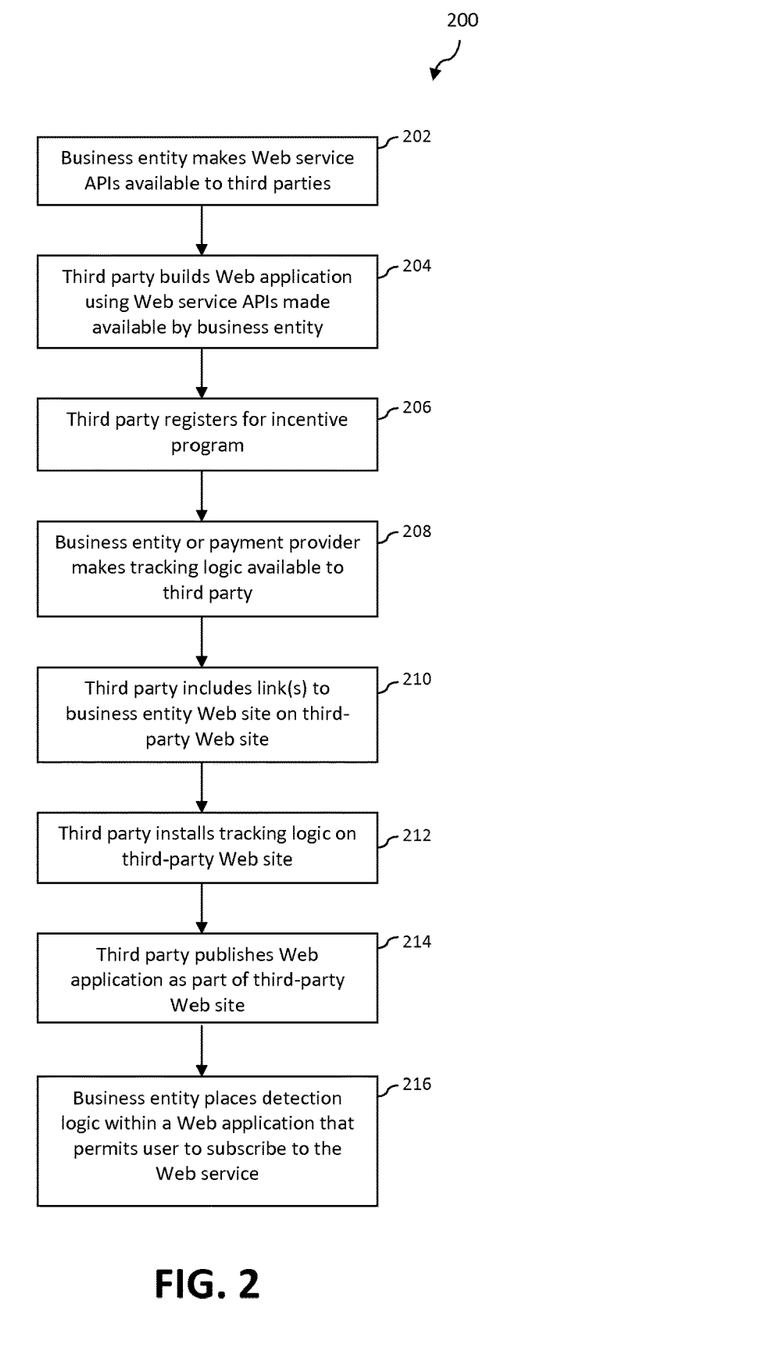
FIG. 2 depicts a flowchart of a method for establishing an incentive-based system for third-party Web application and development in accordance with an embodiment of the present invention.

B. Incentive-Based System and Method for Third-Party Application Development and Publication in Accordance with an Embodiment of the Present Invention FIG. 2 depicts a flowchart 200 of a method for establishing a system by which a business entity can provide an incentive to a third party to develop and publish a Web application that facilitates access to a Web service hosted by the business entity. The method of flowchart 200 includes steps performed by a business entity that owns and operates the Web service as well as by a third party that develops and publishes the Web application. As described below, some of the steps of flowchart 200 may also optionally be performed by a payment provider that operates in conjunction with the business entity. When performed, these steps establish a means by which the third party can receive one or more financial awards as a result of developing and publishing the Web application. In particular, when performed, these steps establish a means by which the third party can receive a payment or commission whenever a user seeking to use the third-party Web application signs up for the Web service in order to use that application.

As shown in FIG. 2, the method of flowchart 200 begins at step 202, in which the business entity makes APIs necessary to access the Web service available to third parties. Such Web service APIs may be required, for example, to access a back-end system owned and operated by the business entity, the back-end system being configured to perform basic functions necessary for providing the Web service. For example, in an embodiment of the present invention in which the Web service is an e-mail service, the Web service APIs may be required to send requests to a back-end system to perform various functions related to sending, receiving, storing, organizing, or deleting e-mail messages, as well as to perform various functions relating to managing an e-mail account. Various functions that could be supported by such e-mail Web APIs are also discussed above in reference to business logic 132 of FIG. 1.

Making the Web service APIs available to a third party may include publishing a Software Developer's Kit (SDK) that includes a description of the APIs that is sufficient to enable a programmer to implement them. The SDK may be published in a printed form or an electronic form. Where the SDK is published in an electronic form it may be distributed via a network such as the Internet. Alternatively, making the Web service APIs available to a third party may include actually providing source code for the APIs. Such source code may be provided or accessed over a network such as the Internet. However, these examples are not intended to limit the present invention and persons skilled in the relevant art(s) will appreciate that the Web APIs may be made available to a third party in any manner suitable for the publication or distribution of printed or electronic information.

At step 204, the third party builds a Web application for accessing the Web service using the Web service APIs ("third-party Web application"). As noted above, the Web application so developed by the third party may provide different or additional features than those provided by a Web application hosted by the business entity, provided that those features are supported by the Web service and provided that the third-party Web application requests such services using the appropriate Web APIs. Furthermore, the Web application so developed by the third party may provide the same features as a Web application hosted by the business entity, but in a different manner or using a different interface.

At step 206, the third party registers for the incentive program. The registration step is necessary to ensure that any payment attributed to the third party as a result of the present method is properly distributed. The information gathered during the registration step may also be used to determine if the third party is eligible for participation in the program. Depending upon the implementation, the third party may be required to register with the business entity and/or with a payment provider that is responsible for determining when payments are due to a third party under the program and for making such payments. The payment provider may be a separate organization that is working in conjunction with or on behalf of the business entity.

The information provided by the third party during the registration step may include third-party identification information, information concerning a Web site published by the third party ("third-party Web site"), and/or payment preference information.

If the third party is a business organization, the third-party identification information may include the organization's name, address, city, state, zip code, country, telephone number, facsimile number, tax ID (SSN/EIN), tax classification, and/or VAT number. Furthermore, if the third party is a business organization, the third-party identification information may also include information about a contact person, wherein such information may include the contact person's first and last name, title/function within the organization, telephone number and e-mail address. If the third party is a person, the third-party identification information may include the person's name, address, city, state, zip code, country, telephone number, facsimile number, and e-mail address.

The information concerning the third-party Web site may include name of the third-party Web site, the URL associated with the Web site, as well as a description or categorical identification of the subject matter of the Web site.

The payment preference information may include a currency and/or payment type, such as check or direct deposit. If the payment type is direct deposit, the payment preference information may further include a country in which the third party is banking, bank name, bank account number and routing number.

The foregoing registration information may be provided by the third party in a number of ways. For example, an on-line registration service may be used to submit such information via a Web browser. Alternatively, the registration information may be provided by filling out an electronic or non-electronic (e.g., paper) document and submitting the document either electronically or non-electronically (e.g., via the mail). As a further alternative, the third party may provide such information via a live telephone call or automated voice response system. However, these examples are not intended to limit the present invention and persons skilled in the relevant art(s) will appreciate that the registration information may be provided in any manner suitable for communicating such information.

At step 208, the business entity or payment provider makes tracking logic available to the third party responsive to successful registration by the third party. As described in more detail herein, the tracking logic is logic that, when embedded in a Web page, will download tracking information, such as one or more HTML cookies, to the browser of a user viewing the Web page for storage on the client device that is executing the browser. The tracking logic may be configured to download the tracking information in response to the user viewing the Web page, in response to the user interacting with a particular object embedded in the Web page, or in response to some other event.

Making the tracking logic available to the third party may include providing a description of the tracking logic to the third party that is sufficient to enable a programmer to implement the logic. Such a description may be provided in a printed form or an electronic form. Where the description is provided in electronic form it may be downloaded via a network such as the Internet. Alternatively, making the tracking logic available to a third party may include actually providing the source code for the tracking logic. Such source code may be provided or accessed over a network such as the Internet. However, these examples are not intended to limit the present invention and persons skilled in the relevant art(s) will appreciate that the tracking logic may be made available to a third party in any manner suitable for the publication or distribution of printed or electronic information.

At step 210, the third party includes a link to a Web site hosted by the business entity ("business entity Web site") within the third-party Web site. The purpose of the link is to direct users that are unauthorized to use the Web service to the business entity Web site for the purpose of subscribing to the service. Such users will be unable to use the third-party Web application. As will be appreciated by persons skilled in the relevant art(s), the link may be represented as a text or graphical object (e.g., a banner) within a Web page of the third party Web site.

The third party may place a link in a Web page that is accessed by a user when the user first accesses the third-party Web site or in a Web page that is only accessed by a user when the user attempts to access the third-party Web application. In accordance with the latter approach, the third party may place the link in a Web page that is generated by the third-party Web application when it is determined that the user is unauthorized to use the Web service that the Web application is designed to access.

At step 212, the third party installs the tracking logic that was made available in step 208 within one or more Web pages of the third-party Web site. The tracking logic may be configured to download tracking information responsive to a user accessing the Web page in which it is located. Alternatively, the tracking logic may be configured to download tracking information responsive to a user interacting with a particular object embedded in the Web page in which it is located. In one implementation, the tracking logic is installed in the same Web page as the link that was installed in step 210 and is configured to download the tracking information responsive to a user activating the link. In a still further implementation, the tracking logic is configured to download tracking information responsive to receiving an indication that the user that is attempting to access the third-party Web application is not authorized to use the Web service.

At step 214, the third party publishes the third-party Web application as part of the third-party Web site. The third-party Web application is now accessible to users via a network, such as the Internet.

At step 216, the business entity places detection logic within a Web application that is accessed via the business entity Web site and that is used to subscribe to the Web service. The detection logic is configured to detect any tracking information that may have been downloaded to a client machine by the tracking logic installed in step 212 and, responsive to detecting the tracking information, to pass some or all of the tracking information to a payment process that issues payment to the third party. In one embodiment of the present invention, the detection logic is placed in a Web page that is displayed to the user when the user has completed the subscription process for the Web service, such as an order confirmation or "thank you" Web page.

In an embodiment, the detection logic comprises a Web beacon that is inserted in the HTML code of a Web page. The Web beacon is configured to retrieve a small and optionally-transparent graphic image from a server owned and operated by the business entity or the payment provider. As part of this process, the Web beacon is configured to return to the server any or all of the tracking information that is detected on the client device being used to access the Web page. However, this approach is described by way of example only, and persons skilled in the relevant art(s) will readily appreciate that other logic may be used to detect the tracking information and to pass it on to the business entity or payment provider.

The tracking information passed to the business entity or payment provider in this manner includes, at a minimum, a unique identifier of the third party. Such a unique identifier may have been assigned to the third party during the registration process described above in reference to step 206. The passing of the tracking information to the business entity or payment provider indicates that a user that is subscribing to the Web service has also previously attempted to use the third-party Web application. Consequently, the business entity or payment provider will issue a payment, or commission, to the third party using the information provided in the registration process. The assumption here is that the user is subscribing to the Web service in order to use the third-party Web application.

Figure 3:
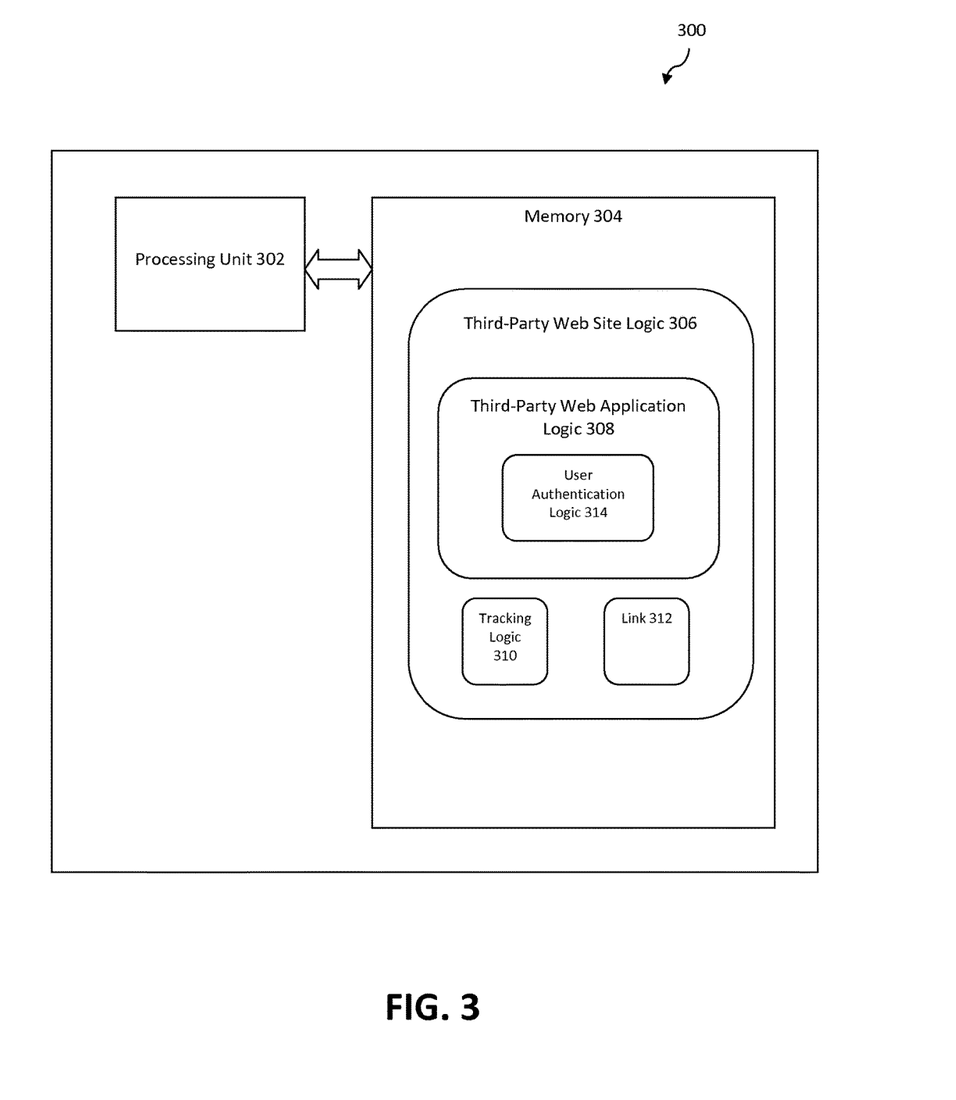
FIG. 3 is a block diagram of a Web server that hosts a third-party Web site and third-party Web application in accordance with an embodiment of the present invention.

FIG. 3 depicts a high-level block diagram of a Web server 300 that hosts a third-party Web site and Web application configured in accordance with the foregoing method. A more detailed description of an example processor-based system that may be used to implement Web server 300 is described below in Section D.

As shown in FIG. 3, system 300 includes a processing unit 302 and a memory 304. Processing unit 302 is configured to execute programming logic stored in memory 304 in a well-known manner.

Memory 304 stores third-party Web site logic 306 that, when executed, enables processing unit 302 to present Web pages and associated content to a user via a Web browser. The Web browser executes on a client device that is communicatively coupled to Web server 300 over a network, such as the Internet.

As further shown in FIG. 3, third-party Web site logic 306 includes third-party Web application logic 308 and tracking logic 310. Third-party Web application logic 308 is configured such that, when it is executed, it enables processing unit 302 to present a third-party Web application to the user via the Web browser that facilitates access to a Web service hosted by a business entity. Tracking logic 310 is configured such that, when it is executed, it enables processing unit 302 to download tracking information for storage by the client device responsive to an indication that the user is attempting to access the third-party Web application via the Web browser. The tracking information is adapted for detection by a Web application hosted by the business entity for subscribing to the Web service (not shown in FIG. 3). The Web application hosted by the business entity is configured to initiate a process for issuing payment to the third party responsive to detecting the tracking information.

In one embodiment of the present invention, the tracking information downloaded by tracking logic 310 comprises one or more HTML cookies.

Tracking logic 310 may be configured such that, when it is executed, it enables processing unit 302 to download the tracking information responsive to the user accessing a particular Web page. Alternatively, tracking logic 310 may be configured such that, when it is executed, it enables processing unit 302 to download the tracking information responsive to an indication that the user that is attempting to access the third-party Web application is not authorized to use the Web service. Such an indication may be provided by user authentication logic 314 that is part of third-party Web application logic 308.

As shown in FIG. 3, third-party Web site logic 306 may further include a link 312. Link 312 is configured such that, when it is executed, it enables processing unit to provide a means for facilitating access to the Web application hosted by the business entity for subscribing to the Web service. In one embodiment of the present invention, tracking logic 310 is configured such that, when it is executed, it enables processing unit 302 to download the tracking information responsive to an indication that the user has activated link 312.

Figure 4:
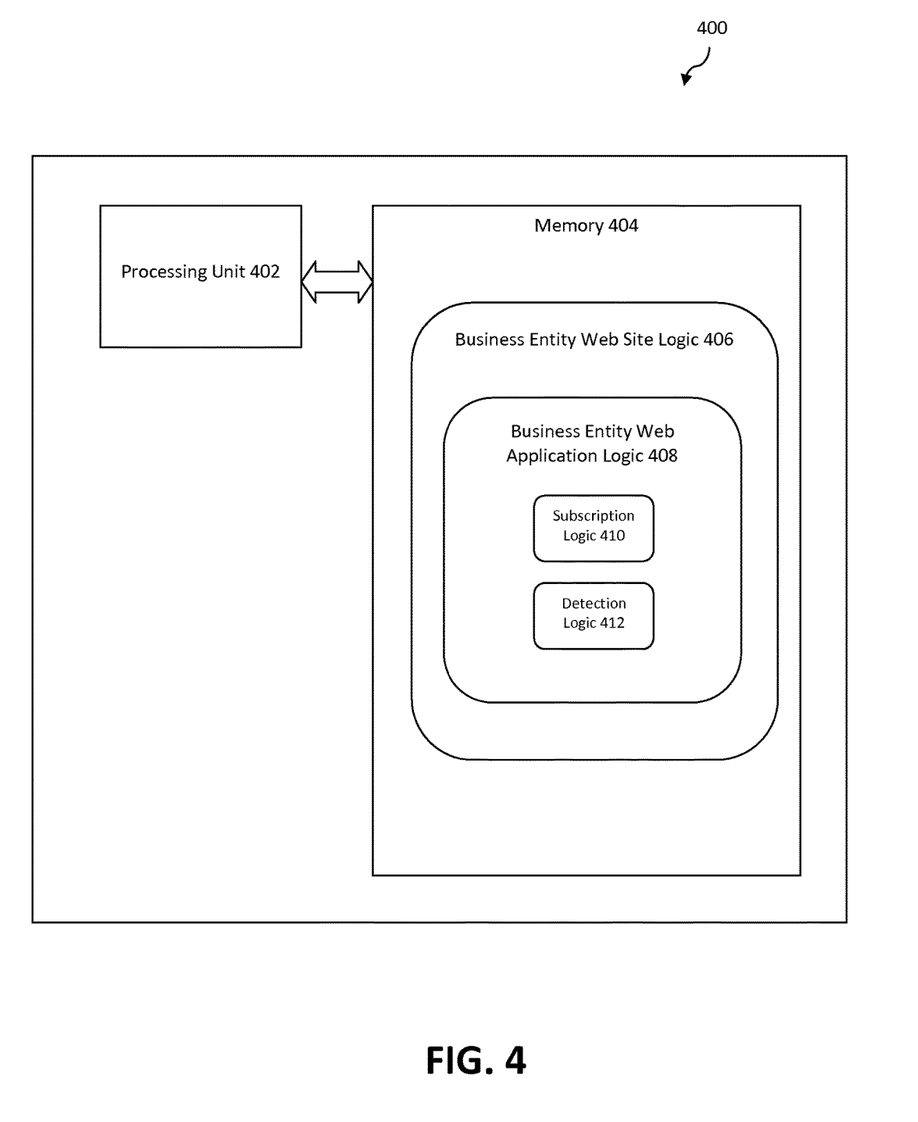
FIG. 4 is a block diagram of a Web server that hosts a business entity Web application for subscribing to a Web service in accordance with an embodiment of the present invention.

FIG. 4 is a high-level block diagram of a Web server 400 that hosts a Web application for subscribing to a Web service that is configured in accordance with the foregoing method of FIG. 2. A more detailed description of an example processor-based system that may be used to implement Web server 400 is described below in Section D.

As shown in FIG. 4, system 400 includes a processing unit 402 and a memory 404. Processing unit 402 is configured to execute programming logic stored in memory 404 in a well-known manner.

Memory 404 stores business entity Web site logic 406 that includes business entity Web application logic 408. Business entity Web application logic 408, when executed, enables processing unit 402 to present Web pages and associated content to a user via a Web browser. The Web browser executes on a client device that is communicatively coupled to Web server 400 over a network, such as the Internet.

As further shown in FIG. 4, business entity Web application logic 408 includes subscription logic 410 and detection logic 412. Subscription logic 410 is configured such that, when it is executed, it enables processing unit 402 to permit the user to subscribe to a Web service hosted by a business entity using the Web browser. Detection logic 412 is configured such that, when it is executed, it enables processing unit 402 to detect tracking information stored on the client device and to initiate a process for issuing payment to a third party responsive to detecting the tracking information. The tracking information has been downloaded to the client device responsive to a user of the Web browser attempting to use a third-party Web application via the Web browser.

In one embodiment of the present invention, the tracking information detected by detection logic 412 comprises one or more HTML cookies.

Detection logic 412 may comprise a Web beacon that is inserted within the HTML code of a Web page. In an embodiment, the detection logic comprises a Web beacon that is inserted in the HTML code of a Web page. The Web beacon may be configured to provide all or a portion of the tracking information to a server operated by the business entity or by a payment provider for use in a payment process. Execution of the payment process results in a payment being issued to the third party that developed the third-party Web application.

Figure 5:
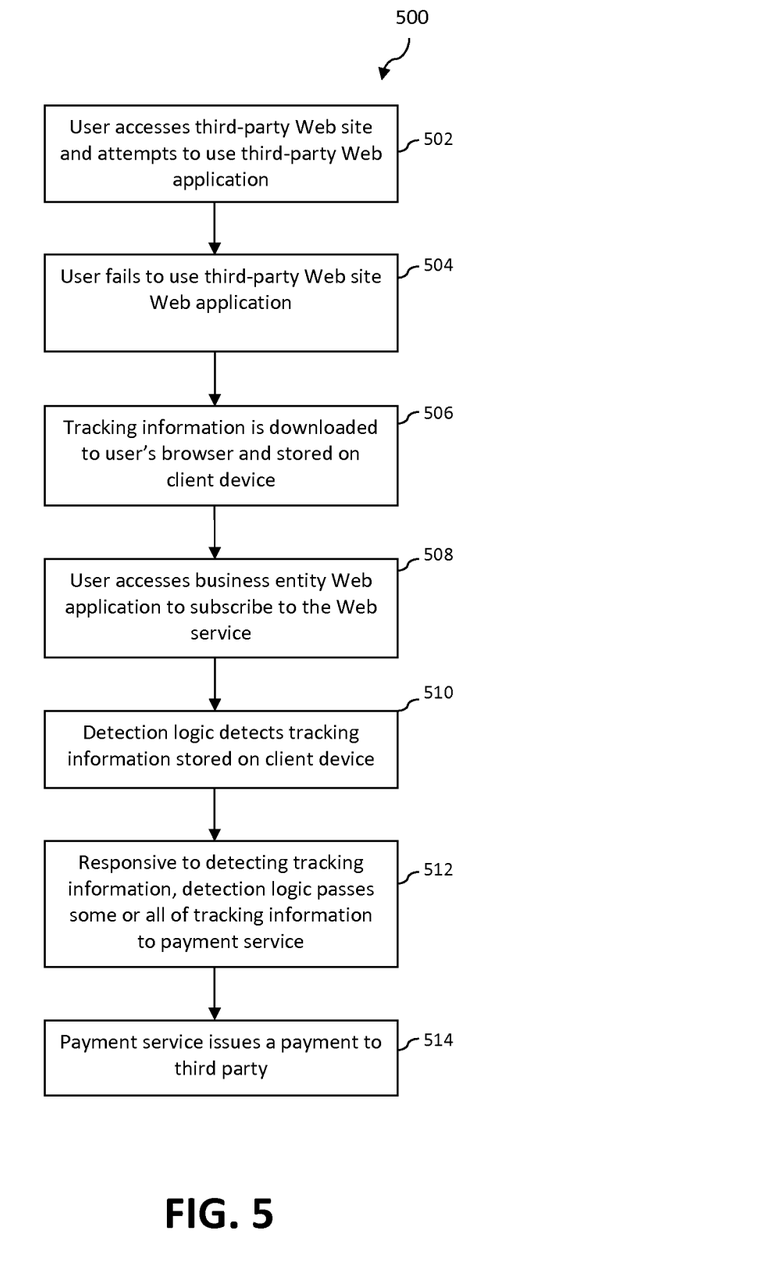
FIG. 5 depicts a flowchart of a method for providing an incentive to a third party to develop and publish a Web application that facilitates access to a Web service hosted by the business entity in accordance with an embodiment of the present invention.

FIG. 5 depicts a flowchart 500 of a method for providing an incentive to a third party to develop and publish a Web application that facilitates access to a Web service hosted by the business entity in accordance with an embodiment of the present invention. The method of flowchart 500 will be described herein with reference to Web server 300 discussed above in reference to FIG. 3 and Web server 400 discussed above in FIG. 4, although the invention is not limited to those embodiments.

Figure 6:
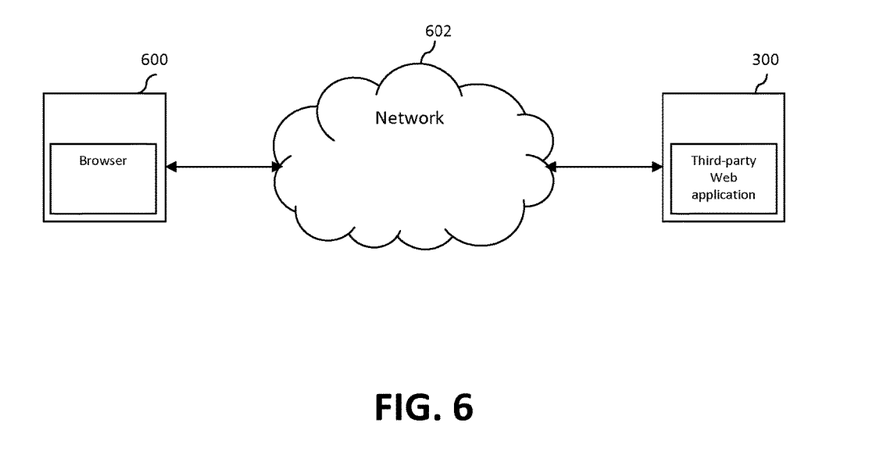
FIG. 6 is a system diagram that illustrates communication between a client device that executes a Web browser and a Web server that hosts a third-party Web application in accordance with an embodiment of the present invention.
Figure 7:
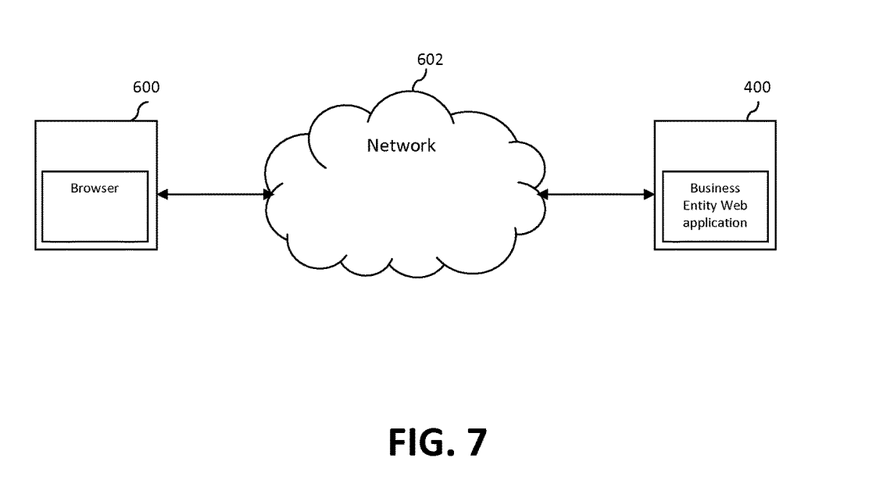
FIG. 7 is a system diagram that illustrates communication between a client device that executes a Web browser and a Web server that hosts a business entity Web application in accordance with an embodiment of the present invention.

As shown in FIG. 5, the method of flowchart 500 begins at step 502 in which a user accesses a third-party Web site and attempts to use a third-party Web application which is part of the third-party Web site. The third-party Web application is configured to facilitate access to the Web service hosted by the business entity. As shown in FIG. 6, the user accesses the third-party Web site by using a Web browser executing on a client device 600. The third-party Web site and third-party Web application are hosted on a Web server 300, which was described above in reference to FIG. 3. All communication between client device 600 and Web server 300 takes place over a network 602 using any of a variety of well-known communication protocols. In an embodiment, network 602 comprises the Internet.

Because the user is not authorized to use the Web service, the user fails to successfully use the third-party Web application, as shown at step 504. Nevertheless, as shown at step 506, tracking logic embedded within the third-party Web site downloads tracking information to the Web browser responsive to the user attempting to use the third-party Web application. For example, the tracking information may be downloaded to the Web browser responsive to the user accessing a particular Web page within the third-party Web site, responsive to the user activating a link within the third-party Web site, or responsive to an unsuccessful attempt by the user to use the third-party Web application to access the Web service hosted by the business entity. The Web browser stores the tracking information in local memory on client device 600. The tracking information may comprise one or more HTML cookies.

At step 508, the user accesses a Web application hosted by the business entity to subscribe to the Web service. The user may access the Web application by activating or following a link provided on the third-party Web site. The user accesses the Web application hosted by the business entity using the same Web browser executing on a client device 600. The business entity Web application is hosted on a Web server 400, which was described above in reference to FIG. 4. All communication between client device 600 and Web server 400 takes place over a network 602 using any of a variety of well-known communication protocols.

Figure 8:
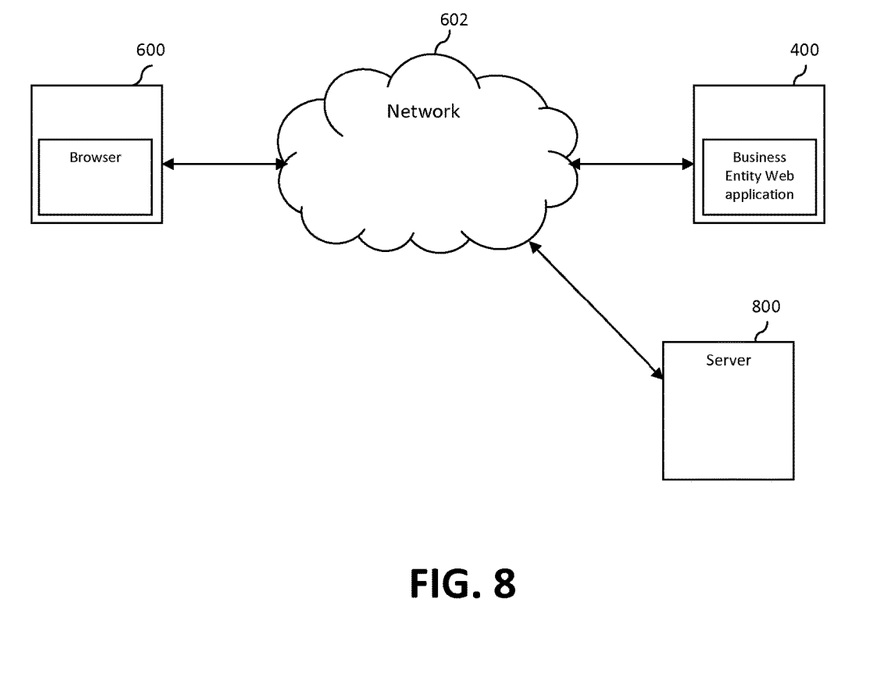
FIG. 8 is a system diagram that illustrates communication between a client device that executes a Web browser, a Web server that hosts a business entity Web application, and a server used to carry out a payment service in accordance with an embodiment of the present invention.

At step 508, detection logic with the Web application hosted by the business entity detects the tracking information that was previously stored on client device 600. At step 510, the detection logic passes some or all of the tracking information to a payment service that is operated by the business entity or a payment provided that works in conjunction with or on behalf of the business entity. In an embodiment, the detection logic comprises a Web beacon that is inserted in the HTML code of a Web page. The Web beacon may be configured to provide all or a portion of the tracking information to a server 800 operated by the business entity or by a payment provider for use in a payment process, as illustrated in FIG. 8.

At step 510, the payment service causes payment being issued to the third party that developed the third-party Web application.

C. Incentive-Based Third Party Development and Publication of Web Applications that Require a User to Upgrade a Web Service in Accordance with an Embodiment of the Present Invention In an embodiment of the present invention, the business entity hosts a Web service that provides two levels of service. A first level of service allows only partial use of the functionality provided by the Web service back-end, while a second level of service allows full use of the functionality provided by the Web service back-end. To implement the two levels of service, the Web service back-end is configured to permit only a subset of the Web APIs to be used for users that it determines are entitled to the first level of service while permitting all of the Web APIs to be used for users that it determines are entitled to the second level of service.

The first level of service may be offered for a smaller subscription fee than the second level of service. Alternatively, the first level of service may be offered for free to registered users, while the second level of service may require payment of a subscription fee.

As will be appreciated by persons skilled in the relevant art(s), the present invention may be utilized to encourage third parties to develop Web applications that support only the second level of service. In particular, using the methods and systems described herein, a third party may be rewarded every time a user subscribes to the second level of the Web service hosted by the business entity in order to use the third-party Web application. Thus, in the sections above in which reference is made to "a user accessing a business entity Web application to subscribe to a Web service," it is to be understood that such language should be broadly construed to include a user accessing a business entity Web application to upgrade from a first level of a Web service to a second level of a Web service.

D. Example Client/Server Implementations

Figure 9:
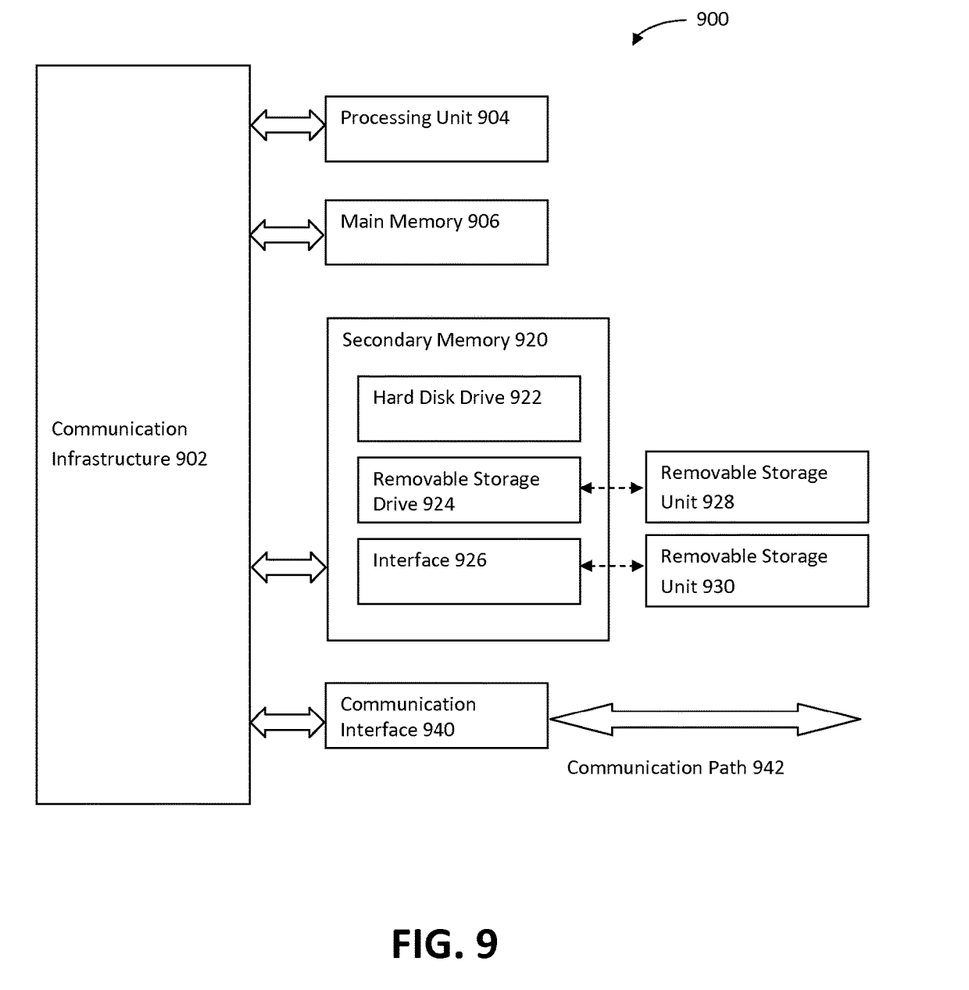
FIG. 9 is a block diagram of a processor-based computer system that may be used to implement a client device or a Web server in accordance with an embodiment of the present invention.

The client devices and Web servers discussed herein may each be implemented using any well-known processor-based computer system. An example of such a computer system 900 is depicted in FIG. 9. For example, Web server 300, Web server 400, and client device 600 (described above in reference to FIGS. 3, 4 and 6, respectively) can be implemented using a computer system such as computer system 900.

As shown in FIG. 9, computer system 900 includes a processing unit 904 that includes one or more processors. Processor unit 904 is connected to a communication infrastructure 902, which may comprise, for example, a bus or a network.

Computer system 900 also includes a main memory 906, preferably random access memory (RAM), and may also include a secondary memory 920. Secondary memory 920 may include, for example, a hard disk drive 922, a removable storage drive 924, and/or a memory stick. Removable storage drive 924 may comprise a floppy disk drive, a magnetic tape drive, an optical disk drive, a flash memory, or the like. Removable storage drive 924 reads from and/or writes to a removable storage unit 928 in a well-known manner. Removable storage unit 928 may comprise a floppy disk, magnetic tape, optical disk, or the like, which is read by and written to by removable storage drive 924. As will be appreciated by persons skilled in the relevant art(s), removable storage unit 928 includes a computer usable storage medium having stored therein computer software and/or data.

In alternative implementations, secondary memory 920 may include other similar means for allowing computer programs or other instructions to be loaded into computer system 900. Such means may include, for example, a removable storage unit 930 and an interface 926. Examples of such means may include a program cartridge and cartridge interface (such as that found in video game devices), a removable memory chip (such as an EPROM, or PROM) and associated socket, and other removable storage units 930 and interfaces 926 which allow software and data to be transferred from the removable storage unit 930 to computer system 900.

Computer system 900 may also include a communications interface 940. Communications interface 940 allows software and data to be transferred between computer system 900 and external devices. Examples of communications interface 940 may include a modem, a network interface (such as an Ethernet card), a communications port, a PCM-CIA slot and card, or the like. Software and data transferred via communications interface 940 are in the form of signals which may be electronic, electromagnetic, optical, or other signals capable of being received by communications interface 940. These signals are provided to communications interface 940 via a communications path 942. Communications path 942 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 928, removable storage unit 930, a hard disk installed in hard disk drive 922, and signals received by communications interface 940. Computer program medium and computer useable medium can also refer to memories, such as main memory 906 and secondary memory 920, which can be semiconductor devices (e.g., DRAMs, etc.). These computer program products are means for providing software to computer system 900.

Computer programs (also called computer control logic, programming logic, or logic) are stored in main memory 906 and/or secondary memory 920. Computer programs may also be received via communications interface 940. Such computer programs, when executed, enable the computer system 900 to implement features of the present invention as discussed herein. Accordingly, such computer programs represent controllers of the computer system 900. Where the invention is implemented using software, the software may be stored in a computer program product and loaded into computer system 900 using removable storage drive 924, interface 926, or communications interface 940.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
   receiving, by a processor, a plurality of Web service APIs;
   building, by the processor, a Web application, the Web application facilitating access to a Web service hosted by a business entity, the Web application for publishing on a Web site, the Web application accessing the Web service using the plurality of Web service APIs;
   transmitting, by the processor, registration for an incentive program to the business entity;
   receiving, by the processor, tracking logic from the business entity for the Web site, the tracking logic downloading tracking information for storage by a client device upon detecting an unsuccessful attempt by a user to access the Web application via a Web browser executing on the client device;
   receiving, by the processor from the business entity, instructions that the tracking information has been detected within a Web application hosted by the business entity; and
   receiving, by the processor, payment responsive to the detecting of the tracking information.

2. The method of claim 1, wherein the tracking logic is configured to download at least one HTML cookie for storage by the client device.

3. The method of claim 1, wherein the tracking logic is configured to download the tracking information responsive to the user accessing a particular Web page within the Web site.

4. The method of claim 1, wherein the tracking logic is configured to download the tracking information responsive to an indication that the user is not authorized to use the Web service.

5. The method of claim 1, further comprising:
   receiving a link within the Web site that facilitates access to the Web application hosted by the business entity for subscribing to the Web service.

6. The method of claim 5, wherein the tracking logic is configured to download the tracking information responsive to the user activating the link.

7. A system comprising:
   a processor; and a storage medium for tangibly storing thereon program logic for execution by the processor, the program logic comprising:
  receiving logic executed by the processor for receiving a plurality of Web service APIs;
  building logic executed by the processor for building a Web application, the Web application facilitating access to a Web service hosted by a business entity, the Web application for publishing on a Web site, the Web application accessing the Web service using the plurality of Web service APIs;
  transmitting logic executed by the processor for transmitting registration for an incentive program to the business entity;
  first receiving logic executed by the processor for receiving tracking logic from the business entity for the Web site, the tracking logic downloading tracking information for storage by a client device upon detecting an unsuccessful attempt by a user to access the Web application via a Web browser executing on the client device;
  second receiving logic executed by the processor for receiving, from the business entity, instructions that the tracking logic has been detected within a Web application hosted by the business entity; and
  third receiving logic executed by the processor for receiving payment responsive to the detecting of the tracking information.

8. The system of claim 7, wherein the tracking logic comprises logic for enabling the Web site to download at least one HTML cookie for storage by the client device.

9. The system of claim 7, wherein the tracking logic comprises logic for enabling the Web site to download the tracking information responsive to the user accessing a particular Web page within the Web site.

10. The system of claim 7, wherein the tracking logic comprises logic for enabling the Web site to download the tracking information responsive to an indication that the user is not authorized to use the Web service.

11. The system of claim 7, wherein the Web site comprises a link that facilitates access to the Web application hosted by the business entity for subscribing to the Web service.

12. The system of claim 11, wherein the tracking logic comprises logic for enabling the Web site to download the tracking information responsive to an indication that the user has activated the link.

13. A non-transitory computer readable storage medium storing computer instructions for execution by a processor, the computer instructions comprising:
  receiving, by a processor, a plurality of Web service APIs;
  building, by the processor, a Web application, the Web application facilitating access to a Web service hosted by a business entity, the Web application for publishing on a Web site, the Web application accessing the Web service using the plurality of Web service APIs;
  transmitting, by the processor, registration for an incentive program to the business entity;
  receiving, by the processor, tracking logic from the business entity for the Web site, the tracking logic downloading tracking information for storage by a client device upon detecting an unsuccessful attempt by a user to access the Web application via a Web browser executing on the client device;
  receiving, by the processor from the business entity, instructions that the tracking information has been detected within a Web application hosted by the business entity; and
  receiving, by the processor, payment responsive to the detecting of the tracking information.

14. The medium of claim 13, wherein the tracking logic is configured to download at least one HTML cookie for storage by the client device.

15. The medium of claim 13, wherein the tracking logic is configured to download the tracking information responsive to the user accessing a particular Web page within the Web site.

16. The medium of claim 13, wherein the tracking logic is configured to download the tracking information responsive to an indication that the user is not authorized to use the Web service.

17. The medium of claim 13, further comprising:
  receiving a link within the Web site that facilitates access to the Web application hosted by the business entity for subscribing to the Web service.

18. The medium of claim 17, wherein the tracking logic is configured to download the tracking information responsive to the user activating the link.

\* \* \* \* \*